(12) United States Patent
Lu

(10) Patent No.: US 7,574,333 B2
(45) Date of Patent: Aug. 11, 2009

(54) APPARATUS AND METHOD FOR MODELING RELATIONSHIPS BETWEEN SIGNALS

(75) Inventor: Joseph Z. Lu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 464 days.

(21) Appl. No.: 10/772,971

(22) Filed: Feb. 5, 2004

(65) Prior Publication Data

US 2005/0177348 A1 Aug. 11, 2005

(51) Int. Cl.
| | |
|---|---|
| G06F 7/60 | (2006.01) |
| G06F 7/00 | (2006.01) |
| G06F 17/10 | (2006.01) |
| G06F 17/16 | (2006.01) |
| G06F 17/00 | (2006.01) |
| G01F 17/00 | (2006.01) |
| G01F 19/00 | (2006.01) |
| G05B 13/02 | (2006.01) |
| G05B 13/04 | (2006.01) |
| G05B 13/00 | (2006.01) |
| H04B 15/00 | (2006.01) |

(52) U.S. Cl. .............................. 703/2; 702/56; 702/190; 702/191; 702/196; 702/197; 700/54; 700/55; 381/94.1

(58) Field of Classification Search ...................... 703/2; 702/196–197, 190–191.56; 708/514, 520, 708/607; 706/22; 700/54–55; 704/236; 381/94.1

See application file for complete search history.

(56) References Cited

U.S. PATENT DOCUMENTS

| | | | |
|---|---|---|---|
| 4,740,968 A | * 4/1988 | Aichelmann, Jr. ........... 714/703 |
| 5,490,516 A | 2/1996 | Hutson | |
| 5,706,402 A | * 1/1998 | Bell ............................ 706/22 |
| 5,980,097 A | * 11/1999 | Dagnachew ................ 708/314 |
| 5,991,525 A | * 11/1999 | Shah et al. ..................... 703/2 |
| 6,026,334 A | 2/2000 | Kayihan et al. | |
| 6,510,354 B1 | * 1/2003 | Lin ............................. 700/55 |
| 6,564,176 B2 | * 5/2003 | Kadtke et al. ............... 702/189 |
| 6,615,164 B1 | * 9/2003 | Gopisetty et al. .............. 703/2 |
| 6,622,117 B2 | * 9/2003 | Deligne et al. .............. 702/190 |
| 6,757,569 B2 | * 6/2004 | Lin .............................. 700/29 |
| 6,907,513 B2 | * 6/2005 | Nakanishi ..................... 712/17 |
| 7,003,380 B2 | * 2/2006 | MacMartin et al. ......... 700/280 |
| 7,035,357 B2 | 4/2006 | Bonhomme | |

(Continued)

OTHER PUBLICATIONS

Zhang et al. "Blind Deconvolution of Dynamical Systems: A State-Space Approach" Journal of Signal Processing vol. 4, No. 2, Mar. 2000, pp. 111-130.*

(Continued)

*Primary Examiner*—Kamini S Shah
*Assistant Examiner*—Suzanne Lo
(74) *Attorney, Agent, or Firm*—Munck Carter, LLP

(57) ABSTRACT

A projection is associated with a first signal and a second signal. The second signal includes a first portion associated with the first signal and a second portion not associated with the first signal. The projection at least substantially separates the first portion of the second signal from the second portion of the second signal. One or more parameters of a model are identified using at least a portion of the projection. The model associates the first signal and the first portion of the second signal.

23 Claims, 10 Drawing Sheets

U.S. PATENT DOCUMENTS

| | | | |
|---|---|---|---|
| 7,089,159 B2* | 8/2006 | Hachiya | 703/2 |
| 2003/0004658 A1* | 1/2003 | Bechhoefer et al. | 702/56 |
| 2003/0061035 A1 | 3/2003 | Kadambe | |
| 2004/0057585 A1* | 3/2004 | Madievski et al. | 381/94.1 |
| 2004/0071103 A1* | 4/2004 | Henttu | 370/320 |
| 2004/0071207 A1 | 4/2004 | Skidmore et al. | |
| 2004/0078412 A1* | 4/2004 | Nakanishi | 708/520 |
| 2005/0015205 A1* | 1/2005 | Repucci et al. | 702/10 |

OTHER PUBLICATIONS

Cardoso, J.F. "Blind signal separation: statistical principles" Proc. of the IEEE vol. 9, No. 10, pp. 2009-2026.*

Sarajedini et al., "Blind signal separation with a projection pursuit index" 1998, IEEE, pp. 2125-2128.*

Swinnen et al. "Detection and multichannel SVD-based filtering of trigeminal somatosensory evoked potentials" Medical & Biological Engineering & Computing, 2000, vol. 38, pp. 297-305.*

Hanna, Magdy T., Multiple signal Extraction by Multiple Interference Attenuation in the Presence of Random Noise in Seismic Array Data, IEEE Transactions on Signal Processing IEEE USA, vol. 51, No. 7, Jul. 2003, p. 1683-1694.

Ku et al., "Preconditioned Iterative Methods for solving Toeplitz-Plus-Hankel Systems," IEEE, 1992, pp. 109-112.

Swinnen et al., "Detection and multichannel SVD-based filtering of trigeminal somatosensory evoked potentials," Medical & Biological Engineering & Computing, 2000, vol. 38, pp. 297-305.

Usefi et al., "A Note on Minors of a Generalized Hankel Matrix," Intern. Math. Journal, vol. 3, 2003, No. 11, pp. 1197-1201.

Moonen et al., "On-and off-line identification of linear state-space models," Int. J. Control, 1989, vol. 49, No. 1, 8 pages.

Olshevsky et al., "Matrix-vector Product for Confluent Cauchy-like Matrices with Application to Confluent Rational Interpolation," ACM, 2000, pp. 573-581.

Dooren, Paul, "Numerical Linear Algebra for Signals Systems and Control," Apr. 24, 2003, 161 pages.

Sima V. et al., "Efficient numerical algorithms and software for subspace-based system identification," Proceedings of the 2000 IEEE Int'l Symposium, Sep. 25-27, 2000, p. 1-6.

Cho Y.M. et al., "Fast recursive identification of state space models via exploitation of displacement structure," Automatica, vol. 30, No. 1, Jan. 1994, p. 45-49.

Gilbert Strang, "Introduction to Linear Algebra," Third Edition, 10 pages. 2003.

Mosises Salmeron et al., "SSA, SVD, QR-cp, and RBF Model Reduction," ICANN 2002, pp. 589-594, 2002.

http://www.alglib.net/matrixops/general/svd.php, 4 pages, 2007.

http://www.netlib.org/lapack/lug/node53.html, 3 pages, 1999.

* cited by examiner

APPARATUS AND METHOD FOR MODELING RELATIONSHIPS BETWEEN SIGNALS

CROSS REFERENCE TO RELATED APPLICATIONS

This patent application is related to U.S. patent application Ser. No. 10/773,017 entitled "APPARATUS AND METHOD FOR ISOLATING NOISE EFFECTS IN A SIGNAL" filed on Feb. 5, 2004, which is incorporated by reference.

TECHNICAL FIELD

This disclosure relates generally to model identification systems and more specifically to an apparatus and method for modeling relationships between signals.

BACKGROUND

Process control systems are often used to control the operation of a system. For example, a process control system may be used to control the operation of a processing facility. As a particular example, a process control system could manage the use of valves in a processing facility, where the valves control the flow of materials in the facility. Example processing facilities include manufacturing plants, chemical plants, crude oil refineries, and ore processing plants.

Conventional process control systems often use models to predict the behavior of a system being monitored. However, it is often difficult to identify the models used by the process control systems. For example, the conventional process control systems often process signals that suffer from noise or other disturbances. The presence of noise in the signals often makes it difficult for a process control system to identify a relationship between two or more signals. As a result, this often makes it more difficult to monitor and control a system.

SUMMARY

This disclosure provides an apparatus and method for modeling relationships between signals.

In one aspect, a method includes receiving a projection associated with a first signal and a second signal. The second signal includes a first portion associated with the first signal and a second portion not associated with the first signal. The projection at least substantially separates the first portion of the second signal from the second portion of the second signal. The method also includes identifying one or more parameters of a model using at least a portion of the projection. The model associates the first signal and the first portion of the second signal.

In another aspect, an apparatus includes at least one input operable to receive a first signal and a second signal. The second signal includes a first portion associated with the first signal and a second portion not associated with the first signal. The apparatus also includes at least one processor operable to generate a projection associated with the first and second signals and to identify one or more parameters of a model associating the first signal and the first portion of the second signal. The projection at least substantially separates the first portion of the second signal from the second portion of the second signal.

In yet another aspect, a computer program is embodied on a computer readable medium and is operable to be executed by a processor. The computer program includes computer readable program code for generating a projection associated with a first signal and a second signal. The second signal includes a first portion associated with the first signal and a second portion associated with at least one disturbance. The projection at least substantially separates the first portion of the second signal from the second portion of the second signal. The computer program also includes computer readable program code for identifying one or more parameters of a model associating the first signal and the first portion of the second signal using at least a portion of the projection.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
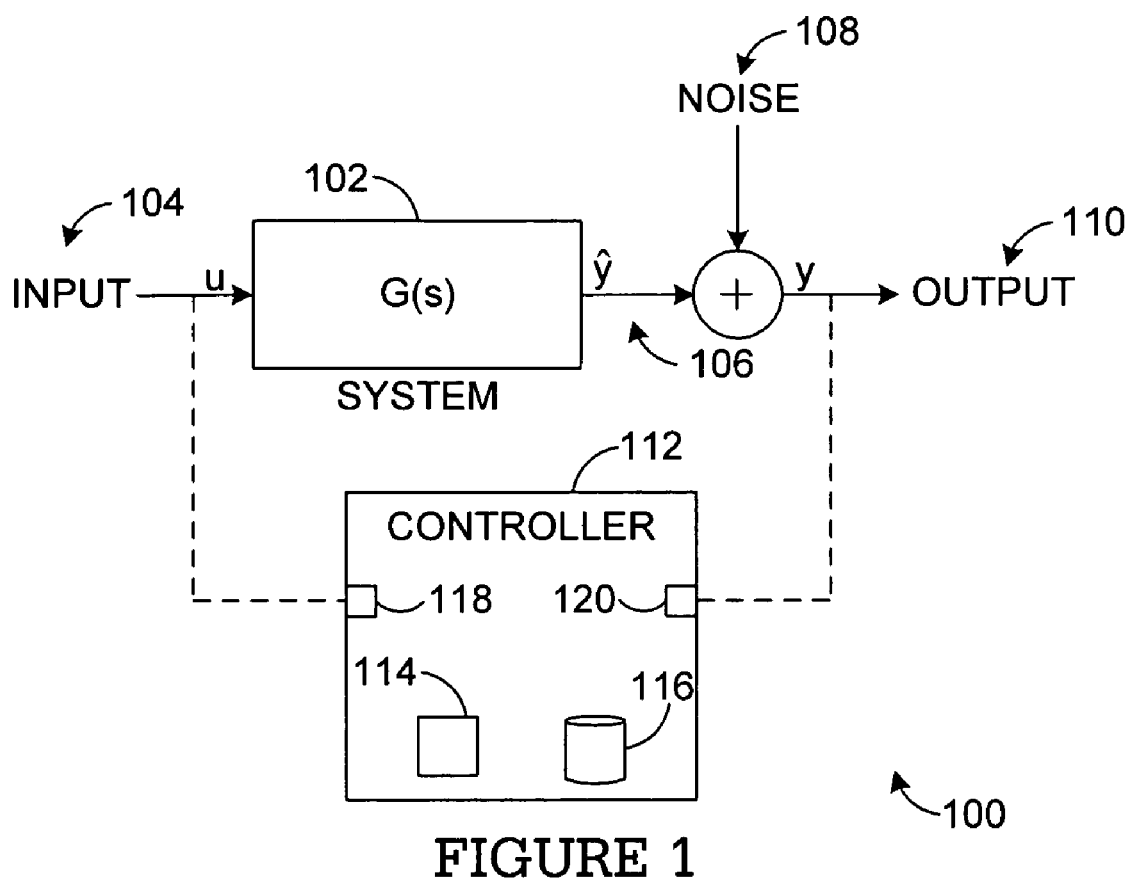
FIG. 1 illustrates an example system for isolating noise effects in a signal according to one embodiment of this disclosure.

FIG. 1 illustrates an example system 100 for isolating noise effects in a signal according to one embodiment of this disclosure. The system 100 shown in FIG. 1 is for illustration only. Other embodiments of the system 100 may be used without departing from the scope of this disclosure.

In this example embodiment, the system 100 includes a monitored system 102. The monitored system 102 represents any suitable system for producing or otherwise receiving an input signal 104 and producing or otherwise providing an ideal output signal 106. In some embodiments, the monitored system 102 is represented by a process model G(s), which represents the transformation of the input signal 104 into the output signal 106.

The monitored system 102 may represent any type of system. The monitored system 102 could, for example, represent a manufacturing or other processing system or a communication system. As a particular example, the monitored system 102 could represent a manufacturing plant having various valves that are controlled based on the input signal 104 and/or the ideal output signal 106. The monitored system 102 could also represent a communication system where the input signal 104 represents a signal transmitted by a mobile telephone and the ideal output signal 106 represents the ideal signal to be received by a base station.

As shown in FIG. 1, the ideal output signal 106 is often corrupted by some type of noise or other disturbance 108.

This leads to the creation of an actual output signal 110. The actual output signal 110 includes a first portion associated with the input signal 104 and a second portion associated with the noise 108. These two portions often overlap, making it difficult to separate them. The noise or other disturbance 108 could represent any suitable disturbance to the ideal output signal 106, such as white noise or colored noise. As a particular example, the monitored system 102 could represent a production system, and the noise 108 could represent white noise introduced into an ideal output signal 106 before the signal 106 is received by a valve controller.

In the example in FIG. 1, the system 100 includes a controller 112, which has access to the input signal 104 and the actual output signal 110. The controller 112 uses the input signal 104 and the actual output signal 110 to control the operation of the monitored system 102. For example, the controller 112 could represent a valve controller capable of controlling the opening and closing of valves in the monitored system 102. As another example, the controller 112 could represent a signal controller capable of analyzing the input signal 104 and the actual output signal 110 and adjusting one or more parameters used to transmit data in the system 100. The controller 112 includes any hardware, software, firmware, or combination thereof for controlling one or more aspects of operation of the system 100. As a particular example, the controller 112 could include one or more processors 114 and one or more memories 116 capable of storing data and instructions used by the processors. In this example, the controller 112 receives the input signal 104 through a first input 118 and the actual output signal 110 through a second input 120.

As shown in FIG. 1, the controller 112 only has access to an output signal 110 that has been altered because of noise or other disturbances 108. Conventional systems attempt to remove noise or other disturbances 108 from a signal 110 using low-pass filtering. Low-pass filters often cannot eliminate much of the noise or other disturbances 108 from a signal 110 without impeding the performance of the system 100.

To facilitate more accurate control over the monitored system 102, the controller 112 generates at least one matrix associated with the input signal 104 and the actual output signal 110. The controller 112 then generates a projection of the matrix using "canonical QR-decomposition." This projects the matrix into orthogonal space, where the projection at least partially separates the input signal 104, the portion of the actual output signal 110 corresponding to the input signal 104, and the portion of the actual output signal 110 corresponding to the noise or other disturbances 108. In this way, the controller 112 at least partially separates the effects of the input signal 104 in the output signal 110 from the effects of the noise 108 in the output signal 110. As a result, the controller 112 is able to more effectively isolate the effects of noise 108 in the actual output signal 110.

QR-decomposition refers to a matrix decomposition performed according to the following equation:

$$A = QR$$

where A represents a matrix being decomposed, Q represents an orthogonal matrix, and R represents an upper triangular matrix.

A problem with conventional QR-decomposition is that a given matrix A could be decomposed in different ways. For example, a given matrix A could be decomposed into [$Q_1 R_1$], [$Q_2 R_2$], or [$Q_3 R_3$]. This creates problems in isolating noise 108 in the actual output signal 110 because it means that the same matrix representing the same input signals 104 and actual output signals 110 could have different QR-decompositions.

Canonical QR-decomposition or "CQR decomposition" represents a unique QR-decomposition where the diagonal values in the triangular matrix R are greater than or equal to zero. The "diagonal values" in the matrix R represent the values along the diagonal between the upper left corner and the lower right corner of the matrix R. By preventing the diagonal values in the upper triangular matrix R from being less than zero, each matrix A can be uniquely decomposed. This helps to facilitate the separation of noise effects contained in the actual output signal 110. In some embodiments, software routines are used to decompose a matrix using canonical QR-decomposition. Example software to decompose a matrix using canonical QR-decomposition is shown in the Software Appendix.

Although FIG. 1 illustrates one example of a system 100 for isolating noise effects in a signal, various changes may be made to FIG. 1. For example, the functionality of the controller 112 could be implemented in any hardware, software, firmware, or combination thereof. Also, the functionality of the controller 112 could be used in any other apparatus, system, or environment. As particular examples, the functionality of the controller 112 could also be implemented in a monitor, modeling tool, evaluator, detector, adapter, or any other device or system.

Figure 2A:
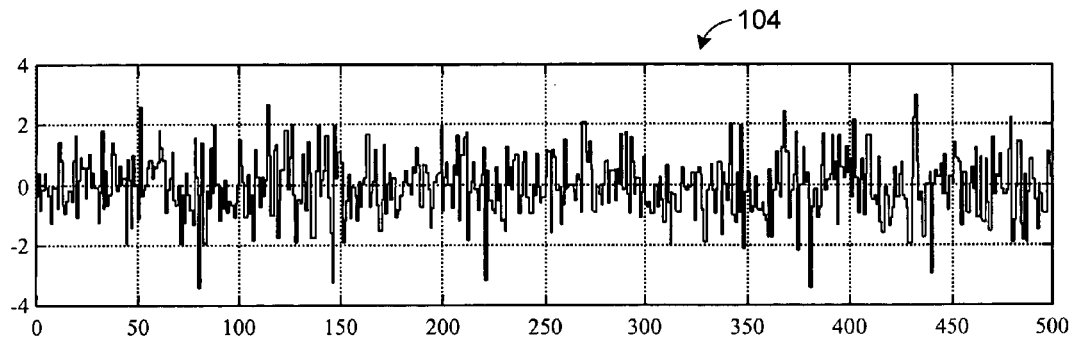
FIGS. 2A through 2C illustrate example signals in the system of FIG. 1 according to one embodiment of this disclosure.
Figure 2B:
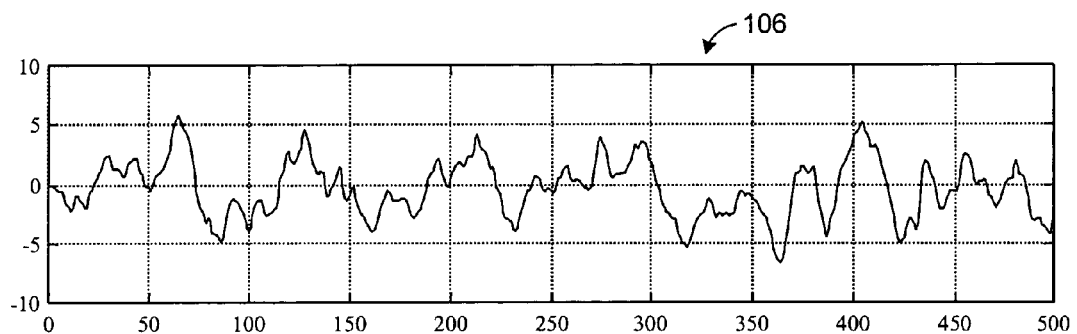
Figure 2C:
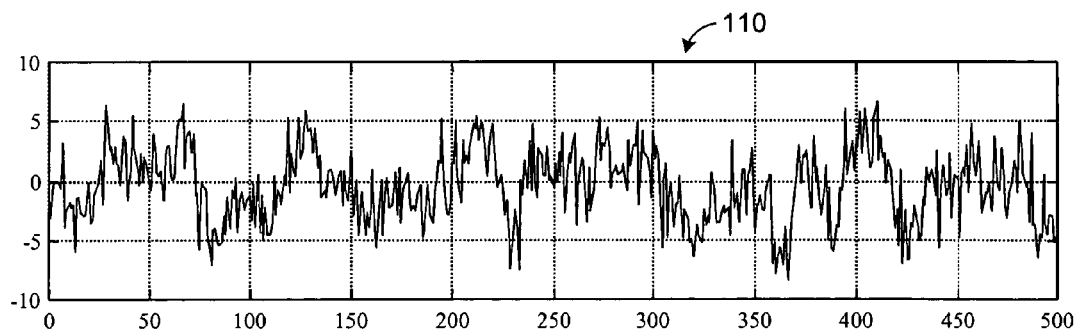

FIGS. 2A through 2C illustrate example signals in the system 100 of FIG. 1 according to one embodiment of this disclosure. The signals shown in FIGS. 2A through 2C are for illustration only. The system 100 of FIG. 1 or other system may receive, produce, or otherwise have access to any other signals without departing from the scope of this disclosure.

FIG. 2A illustrates an example input signal 104 received by the monitored system 102 in FIG. 1. In particular, FIG. 2A plots the values of five hundred samples of the input signal 104. As shown in FIG. 2A, the input signal 104 may vary widely over a small number of samples and over a longer period of time.

FIG. 2B illustrates an example ideal output signal 106 produced or otherwise provided by the monitored system 102 in FIG. 1. In particular, FIG. 2B plots the values of five hundred samples of the ideal output signal 106. As shown in FIG. 2B, this particular ideal output signal 106 varies but not as rapidly or widely as the input signal 104. Also, the ideal output signal 106 does not appear to include random peaks or valleys, which often indicate the presence of noise.

FIG. 2C illustrates an example actual output signal 110 produced or otherwise provided by the monitored system 102 in FIG. 1. In particular, FIG. 2C plots the values of five hundred samples of the actual output signal 110. As shown in FIG. 2C, the actual output signal 110 includes random peaks and valleys, indicating that the actual output signal 110 has been corrupted by noise or other disturbances 108.

The controller 112 or other monitor in the system 100 of FIG. 1 often has access only to the input signal 104 and the actual output signal 110. The controller 112 or other monitor generally lacks access to the ideal output signal 106. As shown in FIG. 2C, it is typically difficult to estimate or extract the ideal output signal 106 from the actual output signal 110. For example, running the actual output signal 110 through a low-pass filter could remove much, but not all, of the noise and also remove some of the ideal output signal 106.

As described above, the controller 112 separates the effects of noise 108 from the effects of the input signal 104 in the output signal 110. In particular, the controller 112 generates a matrix and performs canonical QR-decomposition to project the matrix into orthogonal space, where the input signal 104, the portion of the actual output signal 110 corresponding to the input signal 104, and the portion of the actual output signal 110 corresponding to the noise 108 are at least partially separated. In this way, the controller 112 or other monitor can at least partially separate the noise effects from the input effects in the actual output signal 110.

Although FIGS. 2A through 2C illustrate different examples of the signals in the system 100 of FIG. 1, various changes may be made to FIGS. 2A through 2C. For example, any other or additional signals may be present in the system 100 of FIG. 1 or in any other suitable system. Also, the various signals may represent any suitable information, such as information related to the operation of a valve in a production facility.

Figure 3A:
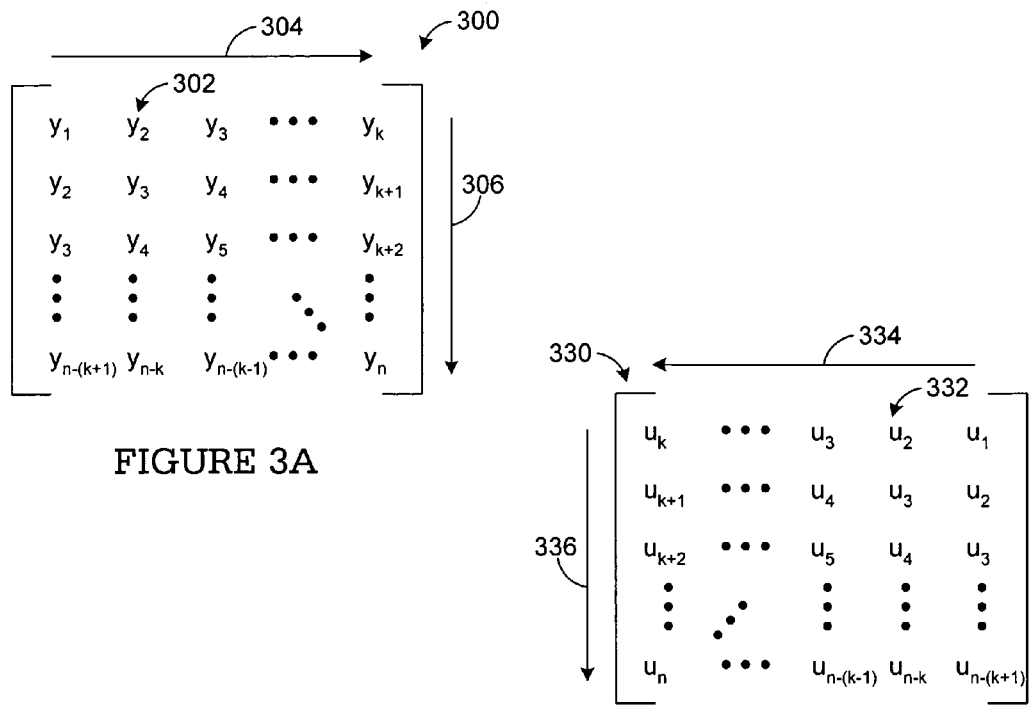
FIGS. 3A through 3C illustrate example matrices used to represent signals in the system of FIG. 1 according to one embodiment of this disclosure.
Figure 3B:
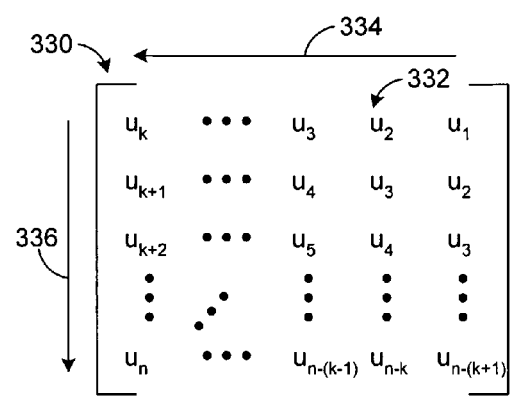
Figure 3C:
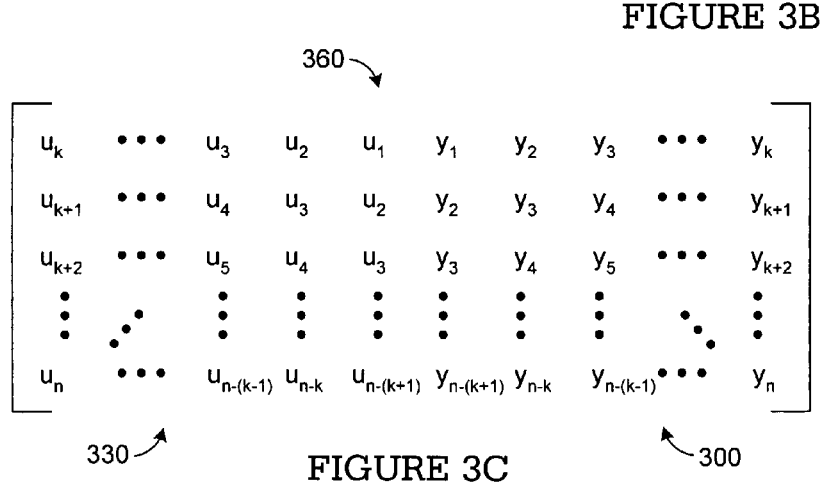

FIGS. 3A through 3C illustrate example matrices used to represent signals in the system of FIG. 1 according to one embodiment of this disclosure. The matrices shown in FIGS. 3A through 3C are for illustration only. The system 100 of FIG. 1 or other system may produce or otherwise use any other matrix or matrices without departing from the scope of this disclosure.

A matrix 300 in FIG. 3A contains samples 302 from the actual output signal 110. As shown in FIG. 3A, each row of the matrix 300 includes k samples 302 of the actual output signal 110, and each column of the matrix 300 includes n−(k+1) samples 302 of the actual output signal 110. In particular embodiments, the number of rows in the matrix 300 is much greater than the number of columns in the matrix 300, although any suitable number of rows and/or columns may be used.

At least some of the samples 302 of the actual output signal 110 appear multiple times in the matrix 300. For example, the sample 302 labeled "$y_2$" appears twice in a diagonal pattern, and the sample 302 labeled "$y_3$" appears three times in a diagonal pattern. Overall, the matrix 300 includes n different samples 302 of the actual output signal 110.

In this example, the matrix 300 represents a "column Hankel matrix." In this type of matrix, the matrix includes a time series of samples 302 in the horizontal direction 304 (left to right) and a time series of samples 302 in the vertical direction 306 (top to bottom). Because the samples 302 in the horizontal direction 304 form a time series in the left-to-right direction, the matrix 300 represents a "forward" column Hankel matrix.

A different matrix 330 is shown in FIG. 3B, which contains samples 332 of the input signal 104. Each row includes k samples, and each column includes n−(k+1) samples. As with the matrix 300 in FIG. 3A, the matrix 330 in FIG. 3B represents a column Hankel matrix. The matrix 330 includes a time series of samples 332 in the horizontal direction 334 and a time series of samples 332 in the vertical direction 336. However, the samples 332 in the matrix 330 represent a time series of samples 332 in the opposite horizontal direction 334 (right to left), so the matrix 330 represents a "backward" column Hankel matrix.

To isolate the effects of noise 108 in the actual output signal 110 from the effects of the input signal 104, the controller 112 may generate the matrices 300, 330 using the samples 302, 332 of the actual output signal 110 and the input signal 104. The controller 112 then generates a matrix 360, which is shown in FIG. 3C. The matrix 360 includes both the backward column Hankel matrix 330 representing the input signal 104 and a forward column Hankel matrix 300 representing the actual output signal 110. After generating the matrix 360, the controller 112 or other monitor decomposes the matrix 360 using CQR decomposition to project the matrix 360 into orthogonal space. The projection at least partially separates the noise effects from the input effects in the actual output signal 110.

Although FIGS. 3A through 3C illustrate example matrices used to represent signals in the system of FIG. 1, various changes may be made to FIGS. 3A through 3C. For example, FIG. 3A shows a forward column Hankel matrix and FIG. 3B shows a backward column Hankel matrix. The matrix 300 in FIG. 3A could be formatted as a backward column Hankel matrix and/or the matrix 330 in FIG. 3B could be formatted as a forward column Hankel matrix.

FIGS. 4A through 4E illustrate example projections used to represent signals in the system of FIG. 1 according to one embodiment of this disclosure. The projections shown in FIGS. 4A through 4E are for illustration only. The system 100 of FIG. 1 or other system may produce or otherwise use any other projections without departing from the scope of this disclosure.

Figure 4A:
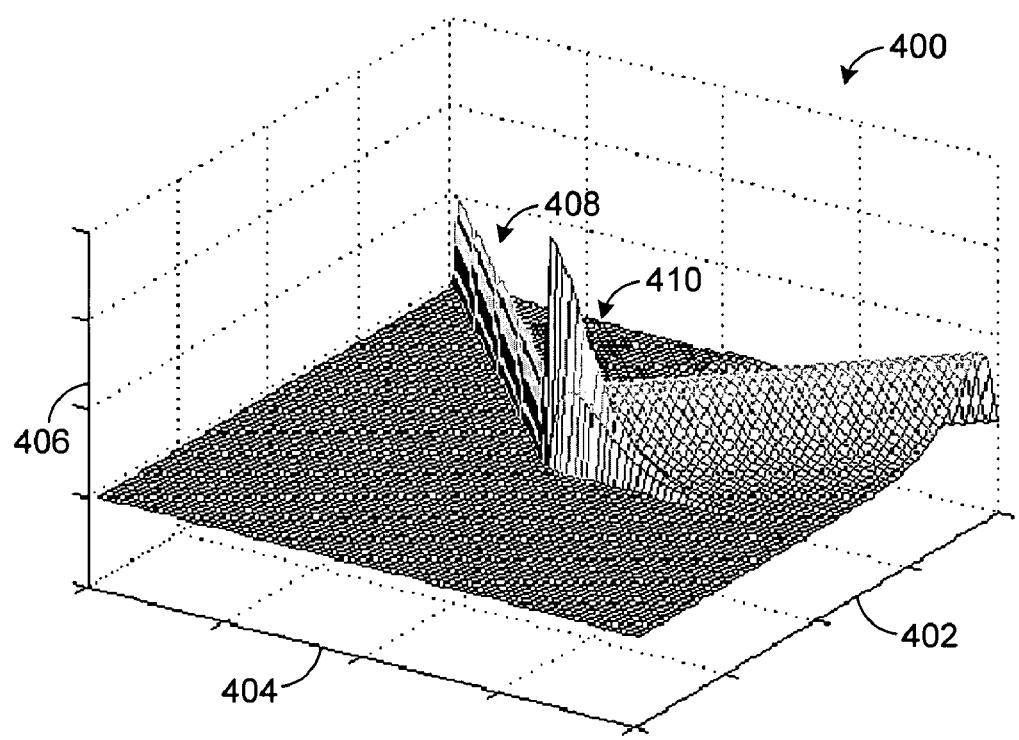
FIGS. 4A through 4E illustrate example projections used to represent signals in the system of FIG. 1 according to one embodiment of this disclosure.

FIG. 4A illustrates a projection 400 associated with a matrix 360, where the left portion of the matrix 360 represents a backward column Hankel matrix of the input signal 104 and the right portion represents a forward column Hankel matrix of the ideal output signal 106. In this example, the matrix 360 is denoted using the notation:

$$[U_b \hat{Y}]$$

where U represents a column Hankel matrix of the input signal 104, Ŷ represents a column Hankel matrix of the ideal output signal 106, and b indicates that a matrix is a backward column Hankel matrix. By default, any matrix without a b sub-notation represents a forward column Hankel matrix.

In this example, the matrix 360 is decomposed using CQR decomposition so as to project the matrix 360 into orthogonal space. The orthogonal space is defined by three axes 402, 404, 406. The first axis 402 represents an index of the rows in the decomposed matrix, and the second axis 404 represents an index of the columns in the decomposed matrix. Both indexes increase moving from left to right in FIG. 4A. The third axis 406 represents the values contained in the decomposed matrix 360.

As shown in FIG. 4A, the projection 400 of the matrix 360 includes two different portions 408 and 410. The first portion 408 represents the input signal 104, and the second portion 410 represents the ideal output signal 106. Because the second portion 410 represents the ideal output signal 106, the second portion 410 represents only the effects of the input signal 104 without any effects of noise or other disturbances 108.

Figure 4B:
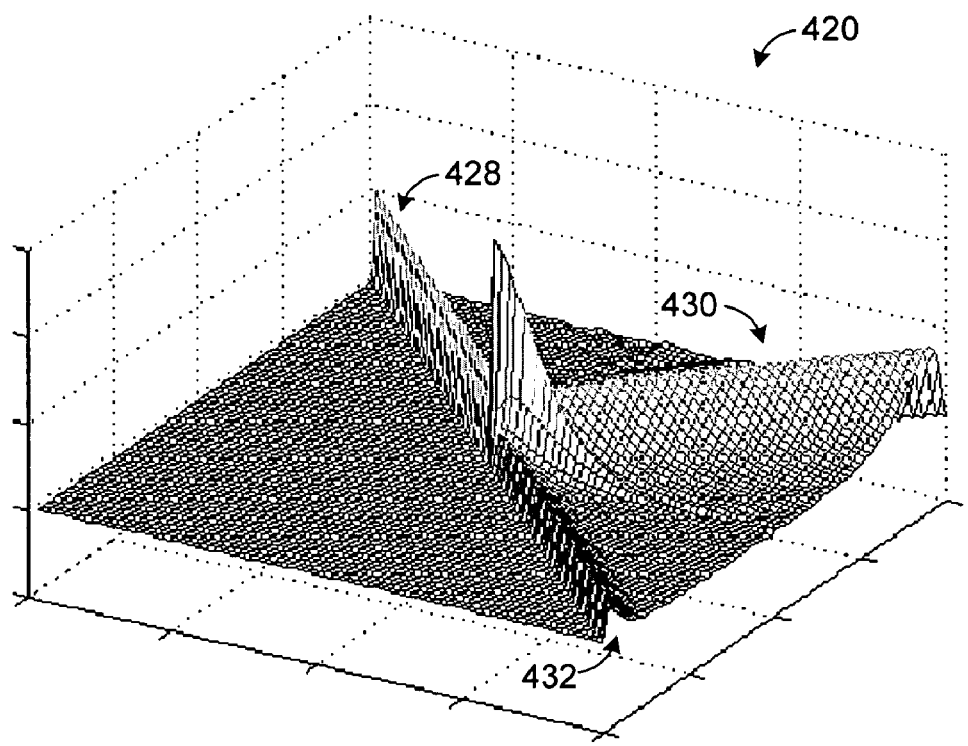

In contrast, FIG. 4B illustrates a projection 420 associated with a matrix 360, where the left portion of the matrix 360 represents a backward column Hankel matrix of the input signal 104 and the right portion represents a forward column Hankel matrix of the actual output signal 110. In this example, the matrix 360 is denoted using the notation:

$$[U_b \hat{Y}]$$

where Y represents a column Hankel matrix of the actual output signal 110.

In this example, the matrix 360 is decomposed using CQR decomposition so as to project the matrix 360 into the same orthogonal space. As shown in FIG. 4B, the projection 420 of the matrix 360 includes three different portions 428, 430, 432. The first portion 428 represents the input signal 104. The second portion 430 substantially represents the portion of the actual output signal 110 caused by the input signal 104. In other words, the second portion 430 of the projection 420 substantially represents the ideal output signal 106. The third portion 432 substantially represents the noise 108 contained in the actual output signal 110. Because the projection 420 substantially separates the response of the system 102 to the input signal 104 from the effects of noise 108, the controller 112 may more accurately process the actual output signal 110.

Figure 4C:
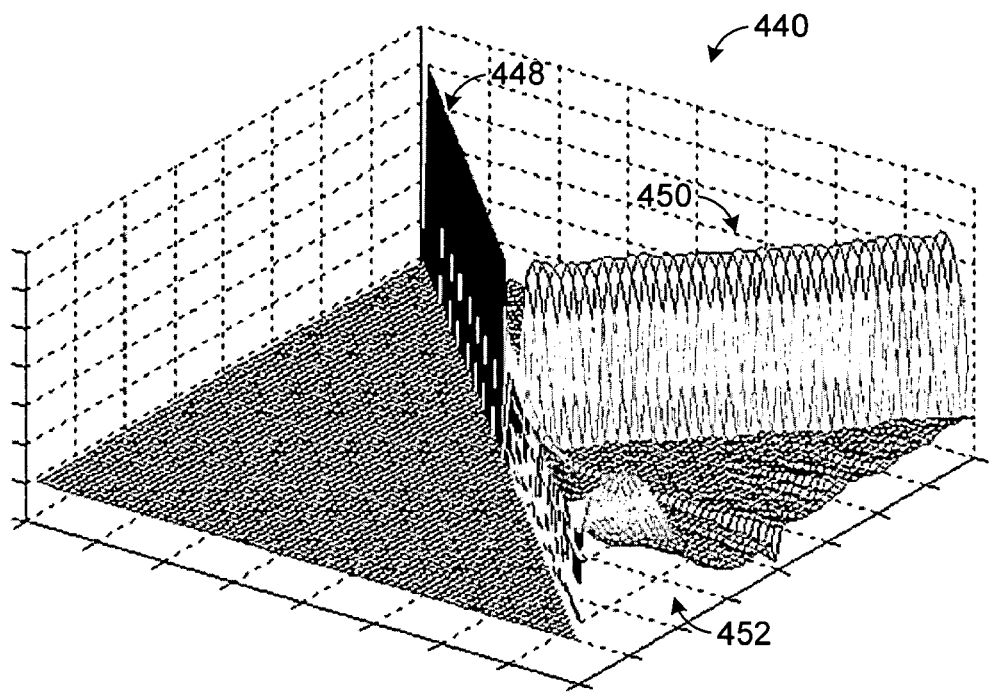

FIGS. 4A and 4B illustrate projections of matrices 360 that include a backward column Hankel matrix on the left side and a forward column Hankel matrix on the right side. Other matrices could be produced and then decomposed according to particular needs. For example, FIG. 4C illustrates a projection 440 associated with a matrix 360, where the left portion of the matrix 360 represents a forward column Hankel matrix of the input signal 104 and the right portion represents a backward column Hankel matrix of the actual output signal 110. In this example, the matrix 360 is denoted using the notation:

$$[U\ Y_b].$$

In this example, the matrix 360 is decomposed using CQR decomposition so as to project the matrix 360 into the orthogonal space. As shown in FIG. 4C, the projection 440 of the matrix 360 includes three different portions 448, 450, 452. The first portion 448 represents the input signal 104. The second and third portions 450, 452 represent the portion of the actual output signal 110 caused by the input signal 104 and the portion of the actual input signal 110 caused by noise 108. However, the second and third portions 450, 452 are interlaced.

Figure 4D:
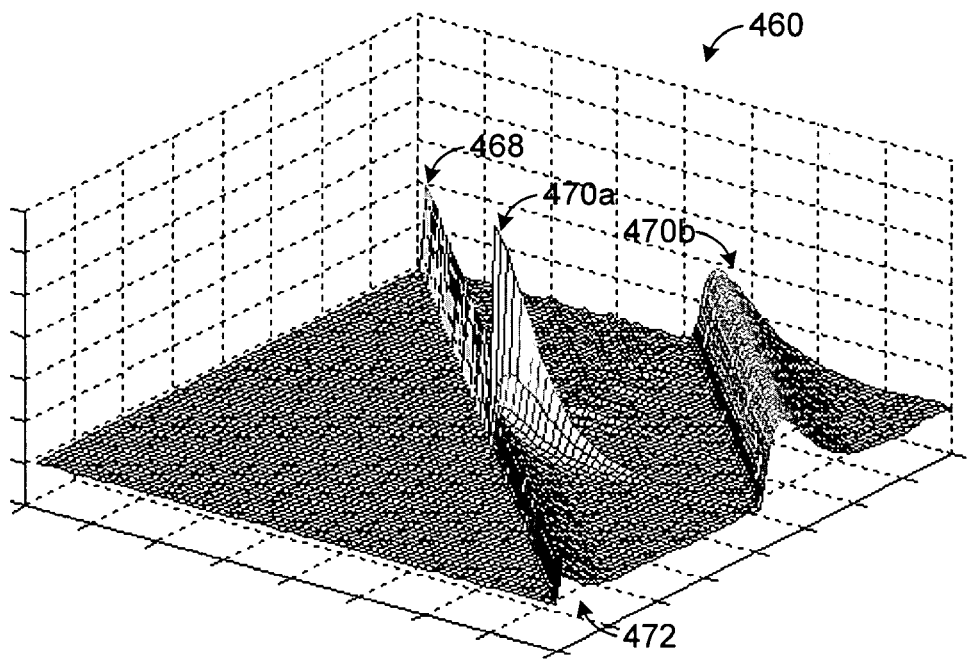

Similarly, FIG. 4D illustrates a projection 460 associated with a matrix 360, where the left portion of the matrix 360 represents a forward column Hankel matrix of the input signal 104 and the right portion represents a forward column Hankel matrix of the actual output signal 110. In this example, the matrix 360 is denoted using the notation:

$$[U\ Y].$$

In this example, the matrix 360 is decomposed using CQR decomposition so as to project the matrix 360 into the orthogonal space. As shown in FIG. 4D, the projection 460 of the matrix 360 includes four different portions 468, 470a-470b, 472. The first portion 468 represents the input signal 104. The second and third portions 470a-470b substantially represent the portion of the actual output signal 110 caused by the input signal 104. As shown in FIG. 4D, the portion of the actual output signal 110 caused by the input signal 104 has been dissected into two different parts 470a and 470b. The fourth portion 472 substantially represents the noise 108 contained in the actual output signal 110.

Figure 4E:
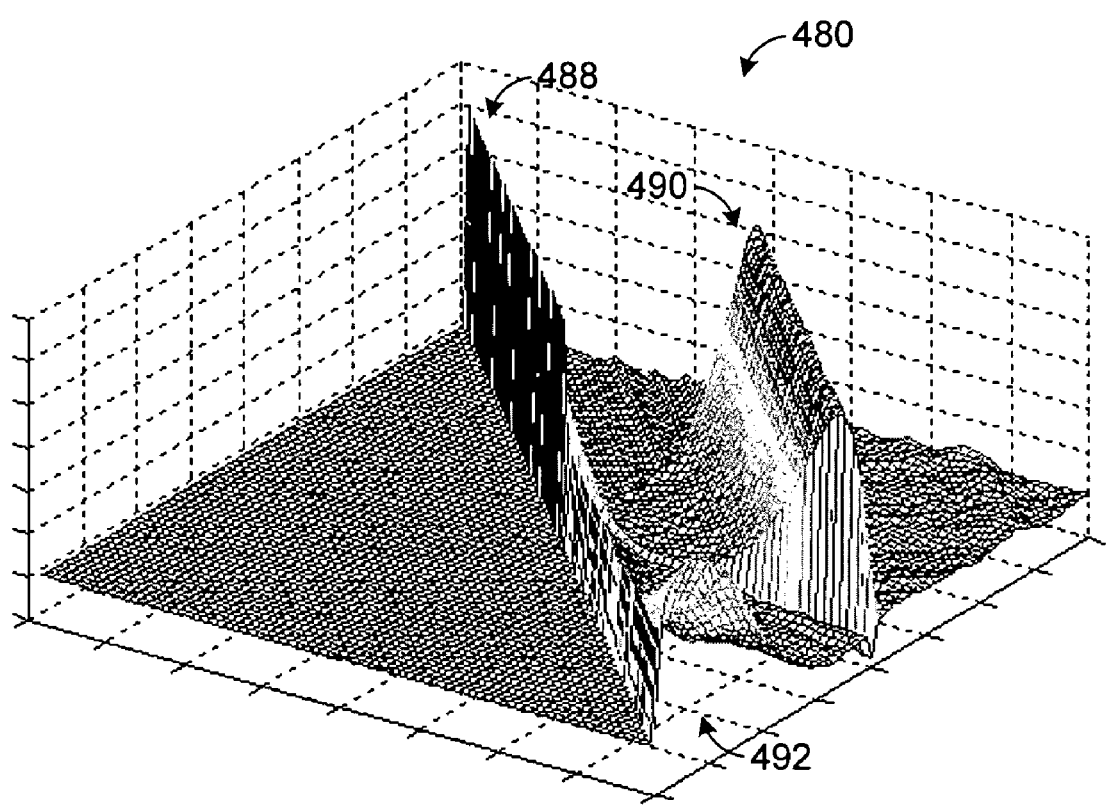

Finally, FIG. 4E illustrates a projection 480 associated with a matrix 360, where the left portion of the matrix 360 represents a backward column Hankel matrix of the input signal 104 and the right portion represents a backward column Hankel matrix of the actual output signal 110. In this example, the matrix 360 is denoted using the notation:

$$[U_b Y_b].$$

In this example, the matrix 360 is decomposed using CQR decomposition so as to project the matrix 360 into the orthogonal space. As shown in FIG. 4E, the projection 480 of the matrix 360 includes three different portions 488, 490, 492. The first portion 488 represents the input signal 104. The second and third portions 490, 492 represent the portion of the actual output signal 110 caused by the input signal 104 and the portion of the actual input signal 110 caused by noise 108. However, the second and third portions 490, 492 are interlaced.

Using one or more of these projections, the controller 112 or other monitor in the system 100 of FIG. 1 may more effectively process the various signals. For example, the controller 112 or other monitor could use the projection 420 in FIG. 4B to identify the effects of the input signal 104 in the actual output signal 110 and the effects of the noise 108 in the actual output signal 110. The controller 112 or other monitor could use this information in any suitable manner. For example, the controller 112 could disregard the effects of the noise 108 in the actual output signal 110 and process only the effects of the input signal 104 in the actual output signal 110. As another example, the controller 112 or other monitor could use this information to identify relationships between the input and output signals.

As can be seen in FIG. 3C, the matrix 360 used to form the projections shown in FIGS. 4A through 4E could become very large as the number of samples grows. For example, if each signal is represented by 10,000 samples, each matrix 300, 330 might have 1,000 columns (k) and 8,999 rows (n−(k+1)), and the matrix 360 would have 2,000 columns and 8,999 rows.

In some embodiments, to reduce the processing power and time needed by the controller 112 to process the signals, the controller 112 processes the samples in batches. For example, the controller 112 could process samples of the input signal 104 and actual output signal 110 in batches of five hundred samples each.

To help reduce the size of the matrix needed to generate a projection, the controller 112 may generate and process a first matrix 360 associated with a first batch of the samples. The first matrix 360 is decomposed into $Q_1$ and $R_1$. To process the next batch of samples, the controller 112 generates a matrix 360 for the next batch of samples and combines that matrix 360 with $R_1$. For example, the controller 112 could combine a new matrix 360 with a previous R matrix to create a concatenated matrix as follows:

$$\begin{bmatrix} R_{x-1} \\ Data_x \end{bmatrix}$$

where x represents the number of the current data segment (where $x \geq 2$), $Data_x$ represents the data samples in the x-th data segment, and $R_{x-1}$ represents the R matrix associated with the (x−1)-th data segment. The matrix resulting from this combination is then processed by the controller 112 and decomposed. This allows the controller 112 to process a smaller matrix, even as the total number of samples becomes very large.

In the example above, the samples in the previous data segments are continuously carried through the processing of future data segments. In effect, the controller 112 is concatenating the data segments together, and the projection corresponding to the x-th data segment represents all previous data segments. In other embodiments, the samples in previous data segments may be phased out of the processing of future data segments. In effect, this provides a "forgetting factor" where older data segments contribute less to the projection than newer data segments. For example, the controller 112 could combine a new matrix 360 with a previous R matrix as follows:

$$\begin{bmatrix} \lambda \times R_{x-1} \\ Data_x \end{bmatrix}$$

where λ represents a value between zero and one. A λ value of one would operate as described above. A λ value of zero causes the controller 112 to ignore the previous R matrix and only process the current data segment. A λ value between zero and one causes the controller 112 to partially consider the previous R matrix in forming the projection, which over time reduces the effects of older data segments to a greater and greater extent.

Although FIGS. 4A through 4E illustrate examples of different projections used to represent signals in the system 100 of FIG. 1, various changes may be made to FIGS. 4A through 4E. For example, the projections shown in FIGS. 4A through 4E are for illustration only. Other signals in the system 100 or other system would have different projections.

Figure 5:
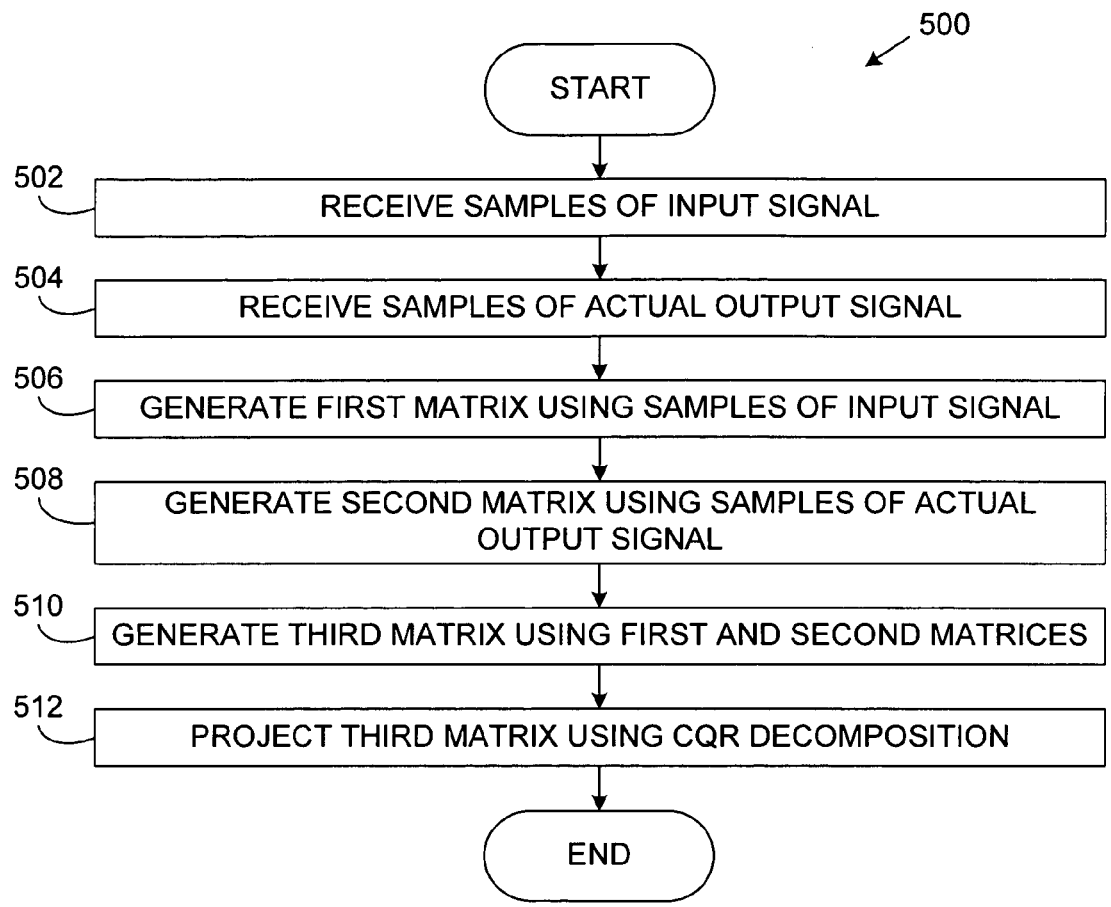
FIG. 5 illustrates an example method for isolating noise effects in a signal according to one embodiment of this disclosure.

FIG. 5 illustrates an example method 500 for isolating noise effects in a signal according to one embodiment of this disclosure. For ease of explanation, the method 500 is described with respect to the controller 112 operating in the system 100 of FIG. 1. The method 500 could be used by any other apparatus or device in any system.

The controller 112 receives samples of an input signal at step 502. This may include, for example, the controller 112 receiving samples of an input signal 104 or the controller 112 receiving the input signal 104 and generating the samples.

The controller 112 receives samples of an actual output signal at step 504. This may include, for example, the controller 112 receiving samples of an actual output signal 110 or the controller 112 receiving the actual output signal 110 and generating the samples.

The controller 112 generates a first matrix using the samples of the input signal at step 506. This may include, for example, the controller 112 generating a forward or backward column Hankel matrix 330 using the samples of the input signal 104.

The controller 112 generates a second matrix using the samples of the actual output signal at step 508. This may include, for example, the controller 112 generating a forward or backward column Hankel matrix 300 using the samples of the actual output signal 110.

The controller 112 generates a third matrix using the first and second matrices at step 510. This may include, for example, the controller 112 generating a third matrix 360 by concatenating the first and second matrices 300, 330.

The controller 112 projects the third matrix into orthogonal space at step 512. This may include, for example, the controller 112 performing CRQ decomposition to project the third matrix 360 into orthogonal space. This may also include the controller 112 generating a projection as shown in FIGS. 4A through 4E.

At this point, the controller 112 may use the projection in any suitable manner. For example, the controller 112 could use the projection to identify a model that relates the input signal 104 to the ideal output signal 106 contained in the actual output signal 110.

Although FIG. 5 illustrates one example of a method 500 for isolating noise effects in a signal, various changes may be made to FIG. 5. For example, the controller 112 could generate the third matrix at step 510 directly after the samples are collected at steps 502, 504. In this example, the controller 112 need not generate the first and second matrices at steps 506, 508.

Figure 6A:
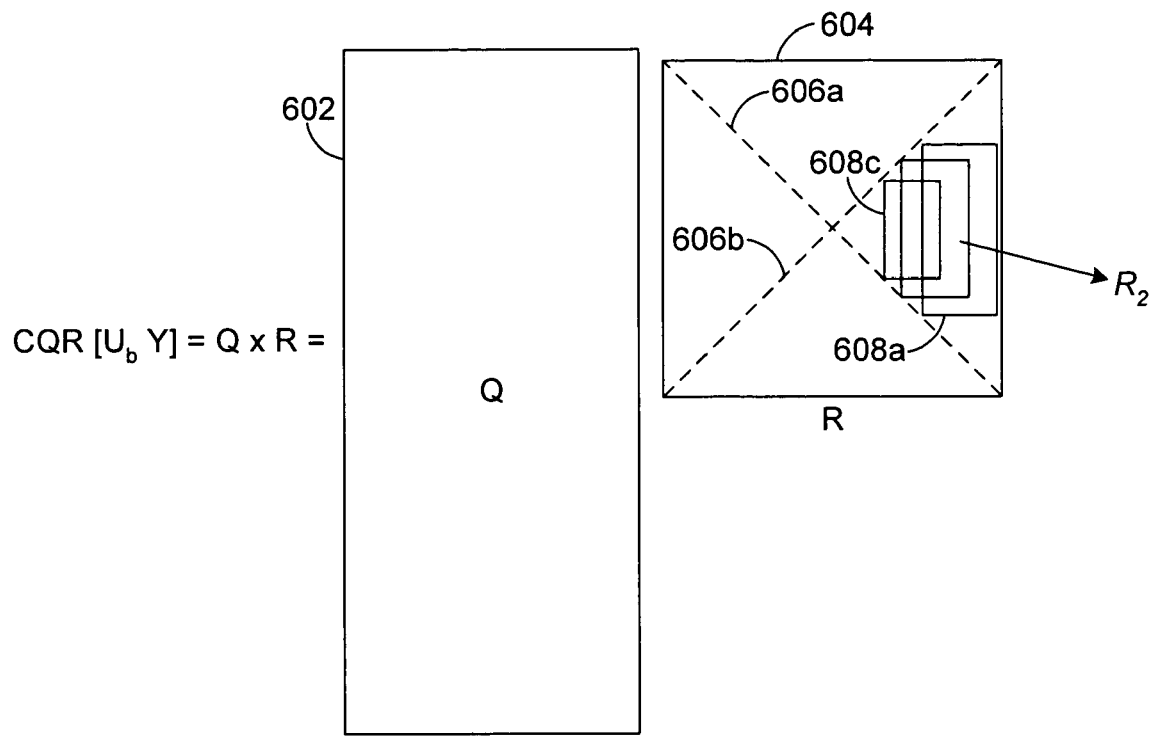
FIGS. 6A through 6C illustrate an example mechanism for applying canonical QR-decompositions to model identification according to one embodiment of this disclosure.
Figure 6B:
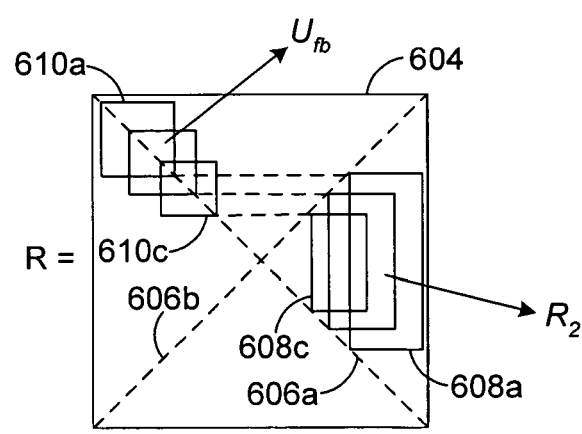
Figure 6C:
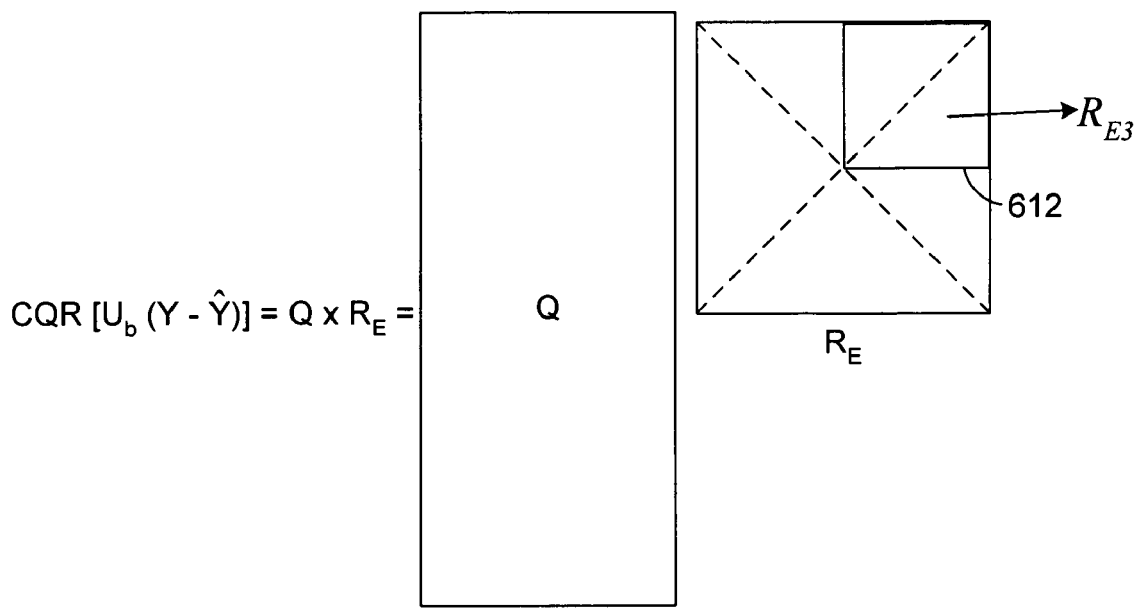

FIGS. 6A through 6C illustrate an example mechanism for applying canonical QR-decompositions to model identification according to one embodiment of this disclosure. The canonical QR-decompositions of a $[U_bY]$ matrix shown in FIGS. 6A through 6C are for illustration only. Other canonical QR-decompositions may be used without departing from the scope of this disclosure.

In general, the controller 112 may perform model identification to model the behavior of the monitored system 102. The monitored system 102 typically may be represented in many different forms. In a particular embodiment, the monitored system 102 is modeled using a state-space model of the form:

$$x_{k+1} = A^*x_k + B^*u_k$$

$$y_k = C^*x_k + D^*u_k$$

where u represents samples of the input signal 104, x represents the states of the monitored system 102, y represents the output of the system 102, and {A,B,C,D} are matrices that represent the parameters of the system 102. In this embodiment, the controller 112 performs model identification by determining values for {A,B,C,D}.

In some embodiments, to perform model identification, the controller 112 generates a projection 420 as shown in FIG. 4B using the signals 104, 110 associated with the monitored system 102. In particular embodiments, the controller 112 identifies values for A, B, C, and D by selecting one or more regions from the projection. Using the selected region(s), the controller 112 identifies pole candidates (values for A and C) and model candidates (values for B and D) for the monitored system 102. The controller 112 then performs model validation and order reduction by selecting poles and an order for the monitored system 102. The selected poles and order are used as the model of the monitored system 102.

FIG. 6A illustrates a canonical QR-decomposition that produces an orthogonal matrix 602 and an upper triangular matrix 604. As shown in FIG. 6A, the upper triangular matrix 604 includes two diagonals 606a and 606b. As described above, the values along the diagonal 606a are each greater than or equal to zero. The diagonals 606 divide the upper triangular matrix 604 into upper, lower, left, and right sections.

In some embodiments, to identify possible poles of the monitored system 102, the controller 112 defines one or more areas 608a-608c in the upper triangular matrix 604. Although FIG. 6A illustrates three different areas 608a-608c, any number of areas 608 could be defined. In particular embodiments, using the one or more areas 608a-608c, the controller 112 identifies the possible poles using the following algorithm:

$[V,S,U] = svd(R_2',0)$ $U_1 = U(:,1:n)$ $[N_g,n] = size(U_1)$ $g = U_1 * diag(sqrt(ss(1:n)))$ $gm = g(1:N_g - N_{out},:)$ $C = g(1:N_{out},:)$ $A = gm \backslash g(N_{out}+1:N_g,:)$ Poles = eig(A).

In this algorithm, [V,S,U] represents V, S, and U matrices produced using singular value decomposition (the svd function call). $U_1$ represents the values along the left-most n columns of the U matrix. The value n represents an order of the monitored system 102 and may be specified by the user, determined by threshold the singular values in the S matrix, or determined in any other suitable manner. $N_g$ represents the number of rows in $U_1$. $N_{out}$ represents the number of outputs in the monitored system 102. The variable g represents an observability matrix. The variable $g_m$ represents a shortened observability matrix. A and C are part of the parameter matrices for representing the monitored system 102. The variable Poles represents the eigenvalues of the matrix A, which are the possible poles of the model. In general, if multiple areas 608 are used with the above algorithm, the number of possible poles candidate increases.

Once candidates for the poles (A and C) of the model have been identified, the controller 112 identifies the model candidates (B and D). As shown in FIG. 6B, for the different pole candidates [C A], different matrices $U_{fb}$ 610a-610c can be identified in the upper triangular matrix 604. The bottom right corner of each of these matrices 610a-610c lies on the diagonal 606a and is parallel to the top of the corresponding $R_2$ area 608a-608c. The size of the matrices 610a-610c can then be selected based on the corresponding size of $R_2$.

Each of these matrices 610a-610c can be rewritten from a backward matrix $U_{fb}$ into a forward matrix $U_f$. The B and D values of the model may then be determined using the following formula:

$$\min_{B,D} \|(I-U_1 U_1^t) R_2^t - L(B,D) U_f\|_2^2$$

where $U_1$ represents the matrix used above to find the pole candidates, I represents an identity matrix, and L(B,D) represents a matrix defined as a function of B and D.

In particular embodiments, the L(B,D) matrix has the following format:

$$L(B, D) = \begin{bmatrix} D & 0 \\ \Gamma_{N-1} B & H_{N-1} \end{bmatrix} - \begin{bmatrix} C\Gamma_N^\psi H_N \\ \Gamma_{N-1}^\psi A \Gamma_N^\psi H_N \end{bmatrix}$$

where $\Gamma_x$ represents an order-x extended observability matrix, $H_x$ represents an order-x block impulse response matrix, and $\chi$ denotes a pseudo-inverse. Examples of $\Gamma_x$ and $H_x$ include:

$$\Gamma_x = \begin{bmatrix} C \\ CA \\ CA^2 \\ \vdots \\ CA^{x-1} \end{bmatrix} \text{ and } H_x = \begin{bmatrix} D & 0 & 0 & \cdots & 0 \\ CB & D & 0 & \cdots & 0 \\ CAB & CB & D & \cdots & 0 \\ \vdots & \vdots & \vdots & \ddots & 0 \\ CA^{x-2}B & CA^{x-3}B & CA^{x-4}B & \cdots & D \end{bmatrix}.$$

In many instances, the formulas and algorithm shown above identify the same model (same values for A, B, C, and D) regardless of the $R_2$ area 608 selected. In other instances, such as when a monitored system 102 suffers from drift, a validation step may be used to remove this undesired effect on the quality of the model selected. For example, in particular embodiments, the following equation is used during the validation step:

$$\min_{p_i \in \{p_1 \ldots p_n\}} \|R_{E3}\|_2^2$$

where $p_i$ represents the i-th pole of the pole candidate set, and $R_{E3}$ is a function of the model parameters A, B, C, and D. As shown in FIG. 6C, $R_{E3}$ can be identified by performing CQR decomposition on a matrix formed by a backward Hankel matrix $(U_b)$ of the input signal 104 and a forward Hankel matrix $(Y-\hat{Y})$ that is made of the prediction error $(y-\hat{y})$.

Although FIGS. 6A through 6C illustrate examples of canonical QR-decompositions used for model identification, various changes may be made to FIGS. 6A through 6C. For example, any number of $R_2$ areas 608 and $U_{fb}$ matrices 610 may be used. Also, the validation step described above may be performed during every model identification, during none of the model identifications, or during some of the model identifications. In addition, other techniques for using the projections of FIGS. 4A through 4E to model relationships between signals could be used.

Figure 7:
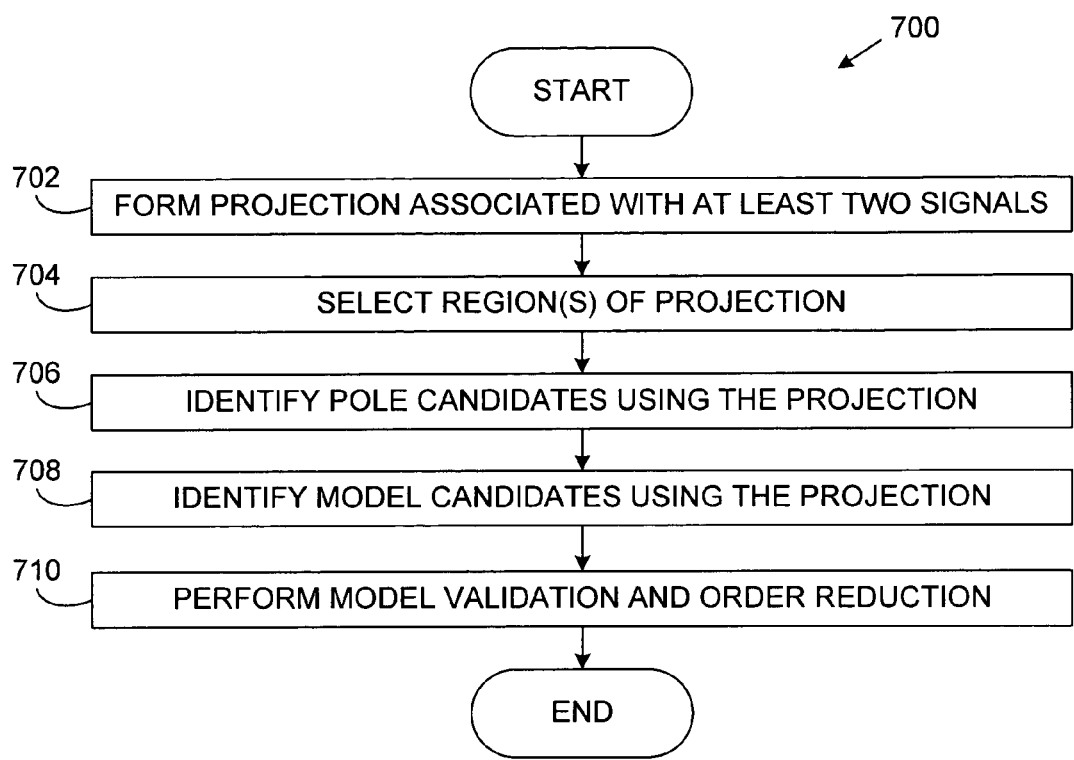
FIG. 7 illustrates an example method for modeling relationships between signals according to one embodiment of this disclosure.

FIG. 7 illustrates an example method 700 for modeling relationships between signals according to one embodiment of this disclosure. For ease of explanation, the method 700 is described with respect to the controller 112 operating in the system 100 of FIG. 1. The method 700 could be used by any other apparatus or device in any system.

The controller 112 forms a projection associated with two or more signals at step 702. This may include, for example, the controller 112 generating a projection as shown in one of FIGS. 4A through 4E using the techniques described above.

The controller 112 selects one or more regions in the projection at step 704. This may include, for example, the controller 112 identifying one or more areas 608 in the projection. The controller 112 could select one or multiple areas 608 based, for example, on user input, a default number and definition of the areas 608, or in any other suitable manner.

The controller 112 identifies one or more pole candidates for the model using the projection at step 706. This may include, for example, the controller 112 using the algorithm shown above in Paragraph [074] to identify possible values for the poles. This may also include the controller 112 using the selected area(s) of the projection to identify the possible poles. The controller 112 could use any other suitable technique to identify values for the poles.

The controller 112 identifies one or more model candidates for the model using the projection at step 708. This may include, for example, the controller 112 using the formulas shown above in Paragraphs [076] and [077] to identify values for the model candidates. This may also include the controller 112 using the selected area(s) of the projection and various information generated during identification of the pole candidates to identify the model candidates. The controller 112 could use any other suitable technique to identify values for the model candidates.

The controller 112 performs model validation and order reduction if necessary at step 710. This may include, for example, the controller 112 using the validation step described above in Paragraph [078] to validate the identified model. This may also include the controller 112 performing system-order reduction to reduce the order of the identified model. However, as described above, the same model may be produced regardless of which $R_2$ area 608 is used by the controller 112 in particular situations. As a result, in these situations, the controller 112 could skip step 710.

At this point, the controller 112 could use the identified model in any suitable manner. For example, the controller 112 could use the model to "de-noise" the actual output signal 110, which is labeled Y. As a particular example, the controller 112 could identify a model having the highest order as plausible. The controller 112 then uses the model to predict what the actual output signal 110 would look like without any noise or other disturbances 108. The predicted signal is referred to as $\hat{Y}$. The controller 112 then defines the noise or drift called e in the actual output signal 110 using the formula:

$e = Y - \hat{Y}$, or $\hat{Y} = Y - E$.

Here, the signal defined by $\hat{Y}$ can be explained by the input signal 104, and the noise or drift defined by e is not explained by the input signal 104. This represents one example use of the identified model. The controller 112 could use the identified model in any other suitable manner.

Although FIG. 7 illustrates one example of a method 700 for modeling relationships between signals, various changes may be made to FIG. 7. For example, the controller 112 could receive a projection produced by another component in the system 100 and process the projection. In these embodiments, the controller 112 need not generate the projection at step 702.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

SOFTWARE APPENDIX

```
function [Q,R]=CQR_H(A,save)
% Usage: [Q,R]=CQR_H(A)
%    Q=CQR_H(A)
% This is CQR Household algorithm. It is as economical as
% the standard QR Household algorithm.
%for testing the algorithm accuracy
A0=A;
[n,m]=size (A);
n1=n+1;
%% trianglize A
mm=min (m,n-1)
for j=1 :mm
    v=HouseHld (A(j:n,j));
    A(j:n,j:m)=HousePre(A(j:n,j:m),v);
    A(j+1:n,j)=v(2: (n1-j));
end
if nargout <=1
Q=A;
else
    if nargin < 2 | n <= m
        R=zeros(size(A))
        Q=eye (n);
        ncol = n;
```

-continued

```
    elseif save == 0 & n > m
        R=zeros (m,m);
        Q=[eye (m) ;zeros (n-m,m)]
        ncol = m;
    else
        error ('input format error')
    end
    for j=mm:-1:1
        v=[1;A(j+1:n,j)]
        Q(j :n,j :ncol)=HousePre(Q(j :n,j :ncol) ,v);
        R (1 :j ,j )=A (1 :j ,j );
        if R(j,j) < 0;
            R(j,j :m) = -R(j,j :m);
            if nargout > 1
                Q(j :n,j) = -Q(j :n,j);
            end
        end
    end
    for j=mm+1:m
        R(1:n,j)=A(1:n,j);
    end
    if m >= n & R(n, n) < 0;
        R(n,n:m) = -R(n,n:m);
        if nargout > 1
            Q (:,n) = -Q(:,n) ;
        end
    end
end
```

```
function [v, P] =HouseHld(x,i)
% v=HouseHld(x,i)
n=length(x);
nx=norm(x);
v=zeros(size (x));
if nargin == 1, i=1; end
ind= [1:i-1,i+1:n];
if nx > eps
    b=x(i)+sign (x(i))*nx;
    v(ind)=x (ind)/b;
else
    v(ind)=x(ind);
end
v(i)=1;
if nargout > 1
        P=eye(n)-(2*v)*(v'/Cv'*v));
end
function A=HousePre(A,v)
% Usage: Ap=HousePre (A,v)
% Pre-multiply the Householder transformation P(v) to A
% Ap = P(v)*A
A = A + ((-2/(v'*v))*v)*(v'*A);
%A = A -((2/(v'*v))*v)*(v'*A);
% = (I -2/(v'*v)*(v*v')) * A
% thus,
% P(v) = I -2/(v'*v)*(v*v') -> symmetric
```

What is claimed is:

1. A method, comprising:

electronically receiving a projection associated with a first signal and a second signal, the first and second signals associated with a control system, the second signal comprising a first portion associated with the first signal and a second portion not associated with the first signal, the projection comprising an upper triangular matrix, the projection at least partially isolating the first portion of the second signal from the second portion of the second signal;

electronically identifying model parameters using at least a portion of the projection; and electronically generating and storing a model associated with the model parameters, the model associating the first signal and the first portion of the second signal;

wherein identifying the model parameters comprises:
identifying one or more pole candidates using one or more first defined areas in the upper triangular matrix, the model parameters comprising at least one of the one or more pole candidates; and
identifying one or more model candidates using one or more second defined areas in the upper triangular matrix, the model parameters comprising at least one of the one or more model candidates; and wherein each of the one or more second defined areas represents a backward column Hankel matrix centered along one of multiple diagonals of the upper triangular matrix, and wherein identifying the one or more model candidates comprises rewriting each backward column Hankel matrix as a forward column Hankel matrix.

2. The method of claim 1, wherein identifying the model parameters further comprises:
selecting at least one of the one or more pole candidates and selecting at least one of the one or more model candidates as the model parameters.

3. The method of claim 1, wherein:
the upper triangular matrix has a plurality of values along one of the diagonals of the upper triangular matrix, each value being greater than or equal to zero.

4. The method of claim 1, wherein:
the diagonals divide the upper triangular matrix into upper, lower, left, and right sections; and
the one or more first defined areas in the upper triangular matrix are located in the right section of the upper triangular matrix.

5. The method of claim 1, wherein:
identifying the model parameters comprises identifying one or more model parameters for each of multiple first defined areas in the upper triangular matrix.

6. The method of claim 5, wherein:
the one or more model parameters associated with different first defined areas in the upper triangular matrix are different; and
identifying the model parameters further comprises selecting the one or more model parameters associated with a specific one of the first defined areas in the upper triangular matrix.

7. The method of claim 1, wherein the projection at least partially isolates the first portion of the second signal from the second portion of the second signal in an orthogonal space.

8. The method of claim 1, wherein:
a first of the diagonals extends from an upper left corner to a lower right corner of the upper triangular matrix; and
a second of the diagonals extends from a lower left corner to an upper right corner of the upper triangular matrix.

9. The method of claim 1, further comprising:
controlling at least a portion of a process using the model.

10. A method, comprising:
electronically receiving a projection associated with a first signal and a second signal, the first and second signals associated with a control system, the second signal comprising a first portion associated with the first signal and a second portion not associated with the first signal, the projection comprising a first upper triangular matrix, having two diagonals that divide the upper triangular matrix into four sections, a first of the diagonals starting at an upper left corner of the upper triangular matrix and traveling down and right in the upper triangular matrix, a second of the diagonals starting at a lower left corner of the upper triangular matrix and traveling up and right in the upper triangular matrix, the projection at least partially isolating the first portion of the second signal from the second portion of the second signal;

electronically identifying one or more model parameters using at least a portion of the projection; and electronically generating and storing a model associated with the one or more model parameters, the model associating the first signal and the first portion of the second signal;

wherein identifying the one or more model parameters comprises:
identifying one or more model parameters for each of multiple defined areas in the first upper triangular matrix, the defined areas located in a single one of the sections of the upper triangular matrix;
selecting the one or more model parameters associated with a specific one of the defined areas in the first upper triangular matrix; and wherein selecting the one or more model parameters associated with the specific one of the defined areas in the first upper triangular matrix comprises:
for each defined area in the first upper triangular matrix, generating a matrix comprising a forward column Hankel matrix based on a prediction error, the prediction error associated with the one or more model parameters that are associated with that defined area;
for each generated matrix, performing canonical QR-decomposition on the matrix to form a second upper triangular matrix, each second upper triangular matrix having an upper right portion denoted $R_{E3}$;
for each second upper triangular matrix, identifying a value for $\|R_{E3}\|_2^2$; and
selecting the one or more model parameters associated with the defined area having the second upper triangular matrix with a smallest value for $\|R_{E3}\|_2^2$.

11. An apparatus, comprising:
at least one input receiving a first signal and a second signal associated with a control system, the second signal comprising a first portion associated with the first signal and a second portion not associated with the first signal; and
at least one processor:
generating a projection associated with the first and second signals and identifying model parameters using at least a portion of the projection, the projection comprising an upper triangular matrix having two diagonals that divide the upper triangular matrix into four sections, a first of the diagonals starting at an upper left corner of the upper triangular matrix and traveling down and right in the upper triangular matrix, a second of the diagonals starting at a lower left corner of the upper triangular matrix and traveling up and right in the upper triangular matrix, the projection at least partially isolating the first portion of the second signal from the second portion of the second signal; and
generating and storing a model associated with the model parameters, the model associating the first signal and the first portion of the second signal;

wherein the at least one processor identifies the model parameters by:
identifying one or more pole candidates using one or more first defined areas in the upper triangular matrix, the model parameters comprising at least one of the one or more pole candidates, the one or more first defined areas located in a single one of the sections of the upper triangular matrix; and identifying one or more model candidates using one or more second defined areas in the upper triangular matrix, the model parameters comprising at least one of the one or more model candidates; and wherein each of the one or more second defined areas represents a matrix centered along one of the diagonals of the upper triangular matrix.

12. The apparatus of claim 11, wherein the at least one processor identifies the model parameters by:
selecting at least one of the one or more pole candidates and selecting at least one of the one or more model candidates as the model parameters.

13. The apparatus of claim 11, wherein:
the upper triangular matrix has a plurality of values along one of the diagonals of the upper triangular matrix, each value being greater than or equal to zero.

14. The apparatus of claim 11, wherein:
the at least one processor identifies the model parameters by identifying one or more model parameters for each of multiple first defined areas in the upper triangular matrix.

15. The apparatus of claim 11, wherein the at least one processor uses the model parameters associated with the stored model to de-noise the second signal.

16. The apparatus of claim 11, wherein:
each matrix centered along one of the diagonals of the upper triangular matrix comprises a backward column Hankel matrix; and
the at least one processor identifies the one or more model candidates by rewriting each backward column Hankel matrix as a forward column Hankel matrix.

17. An apparatus, comprising:
at least one input receiving a first signal and a second signal associated with a control system, the second signal comprising a first portion associated with the first signal and a second portion not associated with the first signal; and
at least one processor:
generating a projection associated with the first and second signals and identifying one or more model parameters using at least a portion of the projection, the projection comprising a first upper triangular matrix, having two diagonals that divide the upper triangular matrix into four sections, a first of the diagonals starting at an upper left corner of the upper triangular matrix and traveling down and right in the upper triangular matrix, a second of the diagonals starting at a lower left corner of the upper triangular matrix and traveling up and right in the upper triangular matrix, the projection at least partially isolating the first portion of the second signal from the second portion of the second signal; and
generating and storing a model associated with the one or more model parameters, the model associating the first signal and the first portion of the second signal;
wherein the at least one processor identifies the one or more model parameters by:
identifying one or more model parameters for each of multiple defined areas in the first upper triangular matrix, the defined areas located in a single one of the sections of the upper triangular matrix; and
selecting the one or more model parameters associated with a specific one of the defined areas in the first upper triangular matrix; and
wherein the at least one processor selects the one or more model parameters associated with the specific one of the defined areas in the first upper triangular matrix by:
for each defined area in the first upper triangular matrix, generating a matrix comprising a forward column Hankel matrix based on a prediction error, the prediction error associated with the one or more model parameters that are associated with that defined area;
for each generated matrix, performing canonical QR-decomposition on the matrix to form a second upper triangular matrix, each second upper triangular matrix having an upper right portion denoted $R_{E3}$;
for each second upper triangular matrix, identifying a value for $\|R_{E3}\|_2^2$; and
selecting the one or more model parameters associated with the defined area having the second upper triangular matrix with a smallest value for $\|R_{E3}\|_2^2$.

18. A computer readable medium embodying a computer program, the computer program comprising:
computer readable program code that receives a projection associated with a first signal and a second signal, the first and second signals associated with a control system the second signal comprising a first portion associated with the first signal and a second portion associated with at least one disturbance, the projection comprising an upper triangular matrix, the projection at least partially isolating the first portion of the second signal from the second portion of the second signal;
computer readable program code that identifies model parameters using at least a portion of the projection; and
computer readable program code that generates and stores a model associated with the model parameters, the model associating the first signal and the first portion of the second signal;
wherein the computer readable program code that identifies the model parameters comprises:
computer readable program code that identifies one or more pole candidates using one or more first defined areas in the upper triangular matrix, the model parameters comprising at least one of the one or more pole candidates; and
computer readable program code that identifies one or more model candidates using one or more second defined areas in the upper triangular matrix, the model parameters comprising at least one of the one or more model candidates; and
wherein each of the one or more second defined areas represents a backward column Hankel matrix centered along one of multiple diagonals of the upper triangular matrix, and wherein the computer readable program code that identifies the one or more model candidates comprises computer readable program code that rewrites each backward column Hankel matrix as a forward column Hankel matrix.

19. The computer readable medium of claim 18, wherein the computer readable program code that identifies the model parameters comprises:
computer readable program code that selects at least one of the one or more pole candidates and that selects at least one of the one or more model candidates as the model parameters.

20. The computer readable medium of claim 18, wherein:
the upper triangular matrix has a plurality of values along one of the diagonals of the upper triangular matrix, each value being greater than or equal to zero.

21. The computer readable medium of claim 18, wherein:
the computer readable program code that identifies the one or more model parameters comprises computer readable program code that identifies one or more model parameters for each of multiple first defined areas in the upper triangular matrix.

22. The computer readable medium of claim 21, wherein:

the one or more model parameters associated with different first defined areas in the upper triangular matrix are different; and the computer readable program code that identifies the model parameters further comprises computer readable program code that selects the one or more model parameters associated with a specific one of the first defined areas in the upper triangular matrix.

23. A computer program readable medium embodying a computer program, the computer program comprising:

computer readable program code that receives a projection associated with a first signal and a second signal, the first and second signals associated with a control system the second signal comprising a first portion associated with the first signal and a second portion associated with at least one disturbance, the projection comprising a first upper triangular matrix, having two diagonals that divide the upper triangular matrix into four sections, a first of the diagonals starting at an upper left corner of the upper triangular matrix and traveling down and right in the upper triangular matrix, a second of the diagonals starting at a lower left corner of the upper triangular matrix and traveling up and right in the upper triangular matrix, the projection at least partially isolating the first portion of the second signal from the second portion of the second signal;

computer readable program code that identifies one or more model parameters using at least a portion of the projection; and computer readable program code that generates and stores a model associated with the one or more model parameters, the model associating the first signal and the first portion of the second signal;

wherein the computer readable program code that identifies the one or more model parameters comprises:

computer readable program code that identifies one or more model parameters for each of multiple defined areas in the first upper triangular matrix, the defined areas located in a single one of the sections of the upper triangular matrix; and computer readable program code that selects the one or more model parameters associated with a specific one of the defined areas in the first upper triangular matrix; and wherein the computer readable program code that selects the one or more model parameters associated with the specific one of the defined areas comprises:

computer readable program code that, for each defined area in the first upper triangular matrix, generates a matrix comprising a forward column Hankel matrix based on a prediction error, the prediction error associated with the one or more model parameters that are associated with that defined area;

computer readable program code that, for each generated matrix, performs canonical QR-decomposition on the matrix to form a second upper triangular matrix, each second upper triangular matrix having an upper right portion denoted $R_{E3}$;

computer readable program code that, for each second upper triangular matrix, identifies a value for $\|R_{E3}\|_2^2$; and computer readable program code that selects the one or more model parameters associated with the defined area having the second upper triangular matrix with a smallest value for $\|R_{E3}\|_2^2$.

* * * * *

UNITED STATES PATENT AND TRADEMARK OFFICE
CERTIFICATE OF CORRECTION

PATENT NO. : 7,574,333 B2 Page 1 of 1
APPLICATION NO. : 10/772971
DATED : August 11, 2009
INVENTOR(S) : Joseph Z. Lu It is certified that error appears in the above-identified patent and that said Letters Patent is hereby corrected as shown below:

Column 11, line 44, delete "X" and replace with --$\psi$--;

Column 14, line 42, delete "P=eye(n)-(2*v)*(v'/Cv'*v))" and replace with --P=eye(n)-(2*v)*(v'/(v'*v))--;

Column 19, claim 23, line 13, delete "program".

Signed and Sealed this

Twentieth Day of October, 2009

David J. Kappos
*Director of the United States Patent and Trademark Office*